(12) United States Patent
Kremer et al.

(10) Patent No.: US 8,763,356 B2
(45) Date of Patent: Jul. 1, 2014

(54) CHAIN, AND METHOD FOR MANUFACTURING A CHAIN

(75) Inventors: Johannes Kremer, Eslohe (DE); Peter Kisters, Uedem (DE); Christian Kirschniok, Moers (DE)

(73) Assignees: Ketten-Wulf Betriebs GmbH, Eslohe-Kueckelheim (DE); Aumund Foerdertechnik GmbH, Rheinberg (DE)

( * ) Notice: Subject to any disclaimer, the term of this patent is extended or adjusted under 35 U.S.C. 154(b) by 0 days.

(21) Appl. No.: 13/807,759

(22) PCT Filed: Jun. 29, 2011

(86) PCT No.: PCT/EP2011/060940
§ 371 (c)(1),
(2), (4) Date: Feb. 28, 2013

(87) PCT Pub. No.: WO2012/001066
PCT Pub. Date: Jan. 5, 2012

(65) Prior Publication Data
US 2013/0203537 A1    Aug. 8, 2013

(30) Foreign Application Priority Data

Jun. 29, 2010  (DE) .......................... 10 2010 025 528

(51) Int. Cl.
*F16G 5/18*    (2006.01)
*F16G 13/04*    (2006.01)

(52) U.S. Cl.
USPC ............................ 59/35.1; 59/5; 59/13; 59/78

(58) Field of Classification Search
USPC ........................................ 59/4, 5, 13, 35.1, 78
See application file for complete search history.

(56) References Cited

U.S. PATENT DOCUMENTS

| 6,589,127 | B1 | 7/2003 | Horie et al. |
| 7,882,689 | B2 * | 2/2011 | Tada et al. ..................... 59/35.1 |
| 2009/0186729 | A1 | 7/2009 | Tohara |
| 2009/0186731 | A1 | 7/2009 | Tohara |

FOREIGN PATENT DOCUMENTS

| DE | 534 759 | 10/1931 |
| DE | 10 2009 005 403 A1 | 7/2009 |

* cited by examiner

*Primary Examiner* — David B Jones
(74) *Attorney, Agent, or Firm* — Laurence A. Greenberg; Werner H. Stemer; Ralph E. Locher

(57) ABSTRACT

A chain, in particular a technical chain, preferably a unidimensionally movable chain (plate link chain), more preferably a bolt chain or roller chain, has at least one or more chain links. The at least one chain link is constructed with pretensioning. A manufacturing method includes the following steps: assembling at least one chain link from at least two link plates with link plate holes and two bolts or sleeves. In the non-assembled state, the link plate is not straight, in particular has a curved form, and/or the link plate and the link plate holes have a hole axis, wherein the hole axis is not right-angled, and/or, in the non-assembled state, the bolt or the sleeve is not straight, in particular has a curved form. The chain is assembled from at least two chain links and at least one chain link is manufactured in this way.

17 Claims, 8 Drawing Sheets

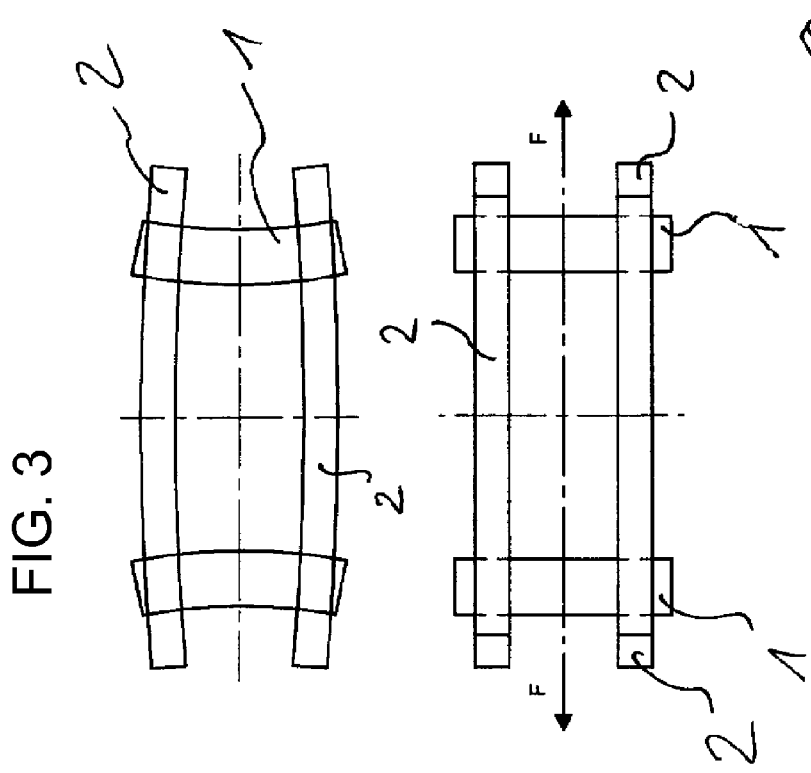
FIG. 3
FIG. 1
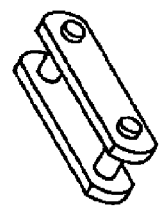
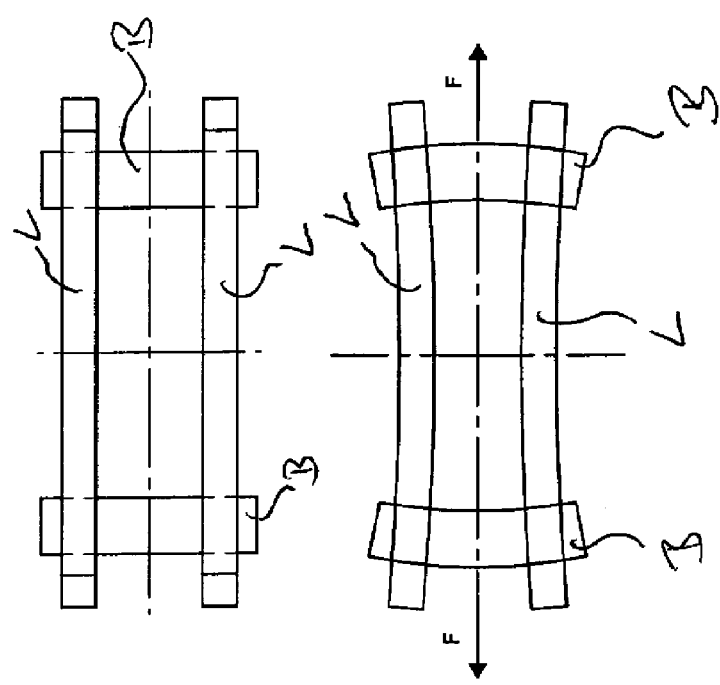
FIG. 4
FIG. 2

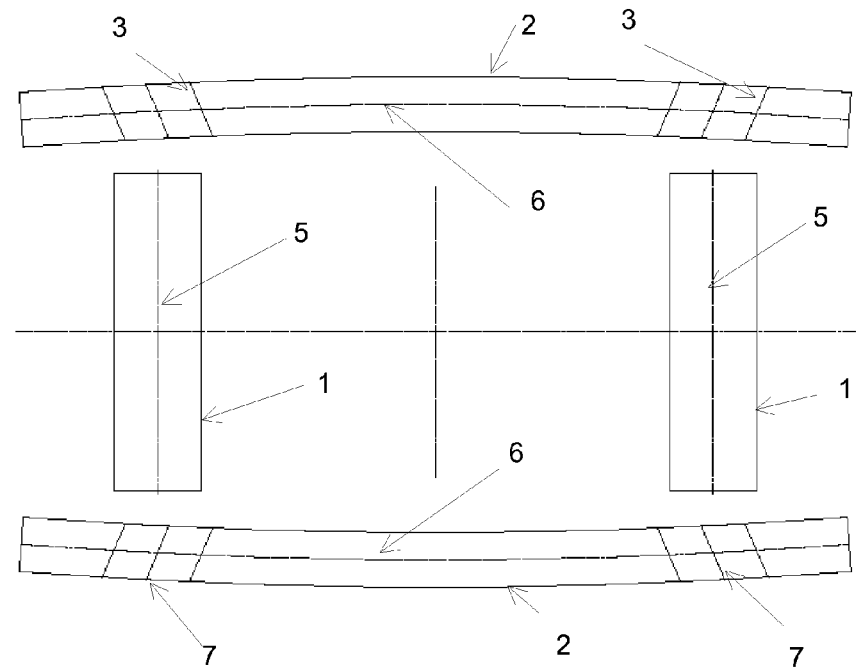
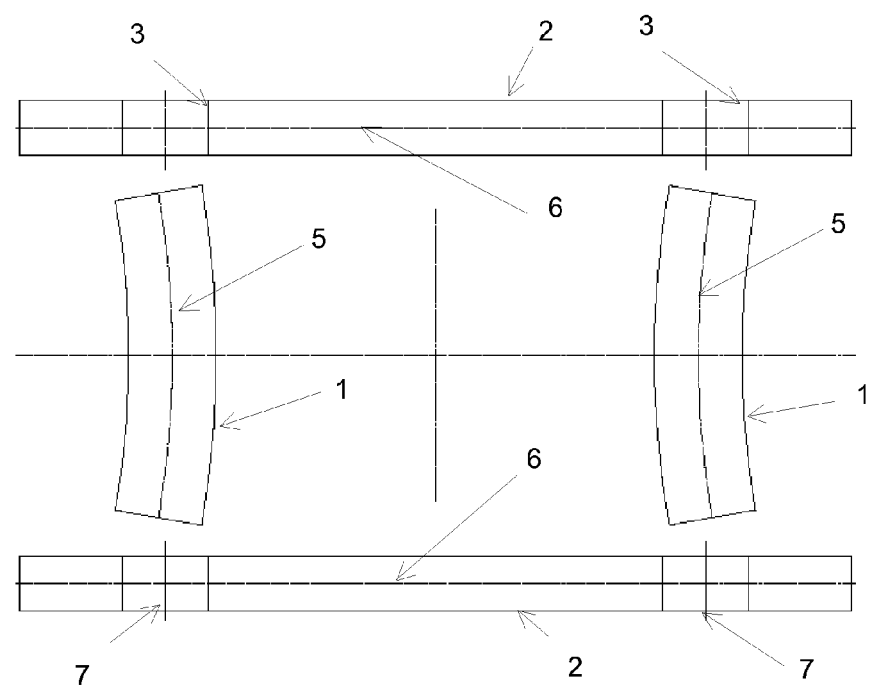

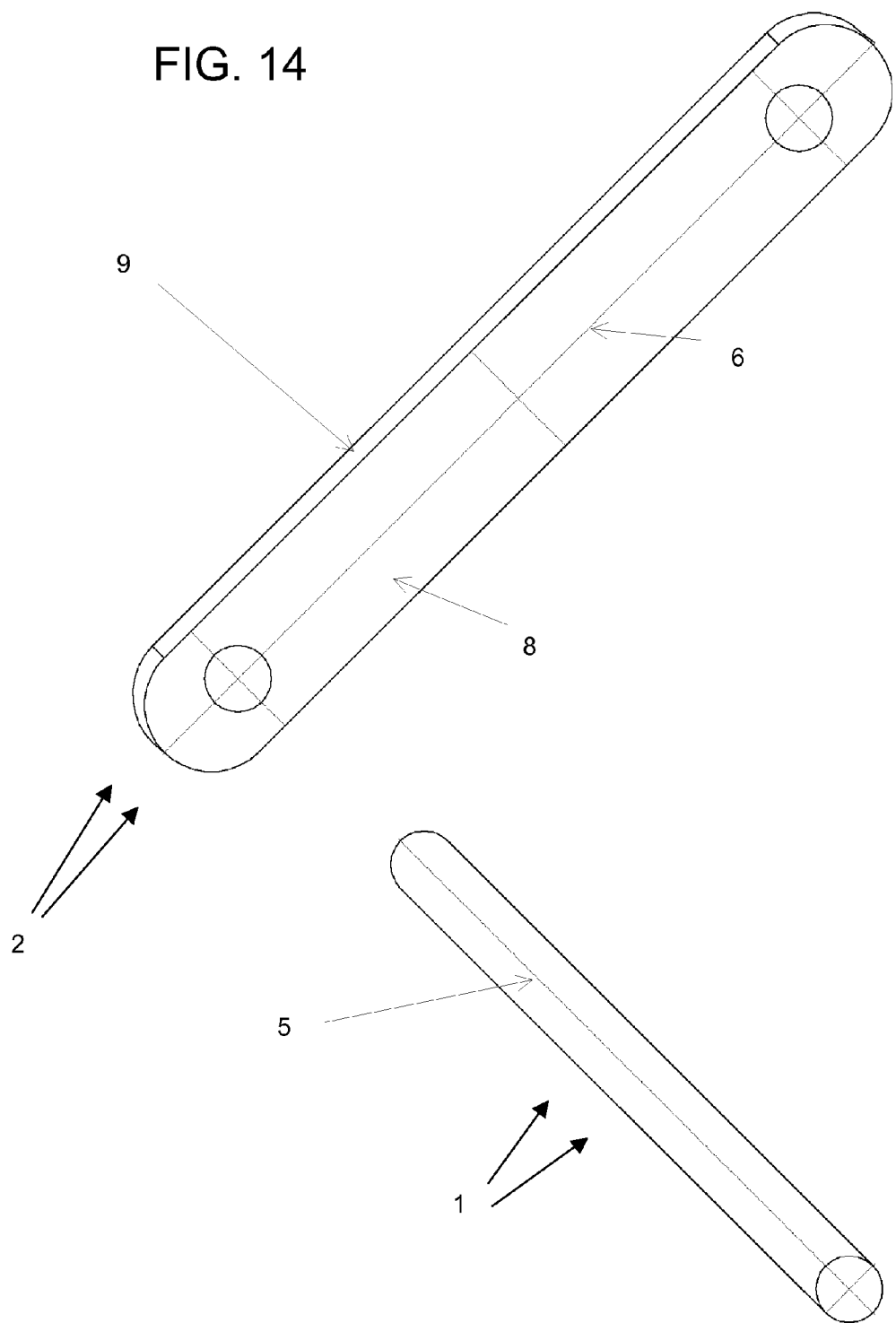

CHAIN, AND METHOD FOR MANUFACTURING A CHAIN

BACKGROUND OF THE INVENTION

Field of the Invention

The present invention relates to a chain, in particular a technical chain, preferably a one-dimensionally movable chain (plate link chain), more preferably a bolt chain or roller chain formed with a plurality of chain elements. The aforementioned chains can be used, for example, as conveyor chains. In addition, the invention relates to a method for manufacturing a chain.

In the case of conveyor chains, considerable or significant bending stresses can occur in the link plates caused by the deformation of the bolt. Said high bending stresses have to be taken into consideration during construction and inevitably result in heavier link plates and consequently in higher chain weights. This, in turn, has a negative effect especially in the case of bucket conveyors. The aforementioned bolts and link plates, in addition also the hollow-cylindrical sleeves used instead of the bolts, are chain elements.

BRIEF SUMMARY OF THE INVENTION

The object of the present invention is correspondingly to propose an improved chain, in particular to propose a chain which, with comparable loading capacity, in particular tensile loading capacity, is able to be manufactured using less material.

As claimed in the invention, said object is achieved by a chain with the characteristic features as claimed. By the chain being manufactured already with at least one pretensioned, in particular negatively pretensioned chain element, in particular a negatively pretensioned bolt or link plate, the bending stress of the chain element, in particular of the link plate or also of the bolt, caused by the operating load can be reduced.

The result is that the chain is able to be manufactured using less material than a chain as claimed in the state of the art with an identical anticipated tensile load, in particular it is possible to use thinner link plates or bolts.

Further advantageous developments of the chain as claimed in the invention are produced in particular from the features of the sub-claims. In principle, the features of the sub-claims are able to be combined together in an arbitrary manner.

In one preferred development of the chain as claimed in the invention, it can be provided, for example, that the at least one chain element installed with pretensioning has a shape that deviates from the straight form in a non-loaded state of the chain. The chain element acts as a spring in this case, in particular a plate spring. Insofar as the chain is loaded in a tensile manner, the chain element can pull straight against the pretensioning.

In one advantageous development of the invention, it can be provided that the chain element is a link plate, wherein the link plate has a longitudinal axis and link plate holes with a hole axis for accommodating a bolt end or a sleeve end, wherein the hole axis is not aligned at right angles, in particular is aligned obliquely with respect to the longitudinal axis or to the direction of pull of the chain. The "oblique" alignment of the link plate holes is an advantageous possibility to introduce the required pretensioning into the chain or into a chain link. It is particularly advantageous in the case of said variant that plate links and bolts are able to be manufactured in each case with a straight extension and consequently in an economical manner and the pretensioning, in particular the negative pretensioning, is created by the oblique link plate holes, which are to be introduced in an economical manner, when the chain link or the chain is assembled.

In a further advantageous development of the chain as claimed in the invention, it can be provided that at least two bolts or sleeves and two link plates form one chain link of the chain, wherein the bolts or sleeves, in a non-loaded state of the chain, have a curvature which in each case faces the other bolt or sleeve, wherein the link plates, in a non-traction-loaded state of the chain, have a curvature which in each case faces away from the other link plate, wherein in particular the link plates, in a traction-loaded state of the chain, in particular the longitudinal axes thereof, are aligned parallel to each other, wherein in particular the bolts or sleeves, in a traction-loaded state of the chain, in particular the longitudinal axes thereof, are aligned parallel to each other. The aformentioned development of the chain or of the chain link can be achieved by just one or also a combination of measures to generate pretensioning. The form of the aforementioned chain elements in a non-tensile loaded state of the chain is presented in this respect by the link plates being able to bend inward and the bolts or sleeves being able to bend outward. As a result, the chain link of a chain as claimed in the invention is pulled straight and is identical to a chain link as claimed in the state of the art in a non-tensile loaded state. If the tensile load is removed, the chain link once again assumes its original non-straight state.

A further object of the invention is to propose a method for manufacturing an improved chain, in particular to propose a method for manufacturing a chain which with comparable loading capacity, in particular tensile loading capacity, is able to be manufactured using less material.

As claimed in the invention, said object is achieved by a method as claimed. In principle, the development, as stated in the claims, of the chain elements used is able to be combined in an arbitrary manner. This essentially depends on at least one measure being taken for generating pretensioning in a chain element. The chain link assembled herefrom is then itself tensioned.

In practice, the negative pretensioning could be produced, for example, by a curved bolt and straight link plate holes (the curved bolts pretensioning the link plates and bolts)

oblique link plate holes and straight bolts (link plates and bolts are pretensioned by the oblique bores in the link plates)

curved link plates with straight link plate holes (link plates and bolts are pretensioned by the curved link plates with the straight holes).

Further measures are conceivable. A number of chain elements are preferably pretensioned in the manner outlined above.

The proposal/approach is basically also applicable to inside links. In this case, the negative pretensioning can be produced, for example, by curved sleeves and straight link plate holes (the curved sleeves pretensioning the link plates and sleeves)

oblique link plate holes and straight sleeves (the link plates and sleeves are pretensioned by the oblique bores in the link plates)

curved link plates with straight link plate holes (the link plates and sleeves are pretensioned by the curved link plates with the straight holes).

Further features and advantages of the present invention become clear by way of the following description of preferred exemplary embodiments with reference to the accompanying figures, in which:

BRIEF DESCRIPTION OF THE SEVERAL VIEWS OF THE DRAWING

FIG. 1 shows two bolts and two link plates of a chain as claimed in the prior art without tensile load (F);

FIG. 2 shows two bolts and two link plates of a chain as claimed in the prior art with tensile load (F);

FIG. 3 shows a chain as claimed in the invention, in particular two bolts and two link plates, without tensile load (F);

FIG. 4 shows a chain as claimed in the invention, in particular two bolts and two link plates, with tensile load (F);

FIGS. 5-11 show exploded representations of chain elements prior to being assembled to form a chain link or to form a chain as claimed in the invention;

FIG. 14 shows a link plate to represent the side face and end face and a bolt.

Figure 5:
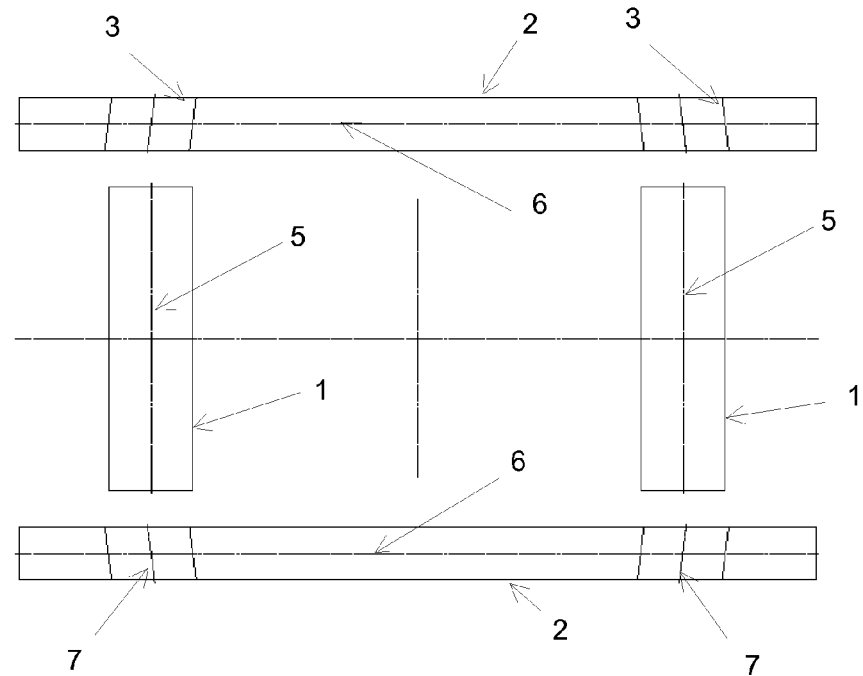

The following references are used in the figures:
B Bolt (prior art)
L Link plate (prior art)
F Tensile force/possible running direction
1 Bolt
2 Link plate
3 Link plate hole
4 Sleeve
5 Longitudinal axis of the bolt or of the sleeve in the non-installed state
6 Longitudinal axis of the link plate in the non-installed state
7 Hole axis of the link plate hole
8 Side face
9 End face
5' Longitudinal axis of the bolt of the sleeve in the installed state
6' Longitudinal axis of the link plate in the installed state

DESCRIPTION OF THE INVENTION

Reference is made initially to FIG. 1. The representation of the deformation is shown to excess in all the figures for illustrative purposes.

FIG. 1 shows several chain elements of a chain as claimed in the prior art, in particular two bolts B and two link plates L, in a non-loaded state, in particular without tensile force F. It can be seen that the chain elements, in particular the bolts and link plates, are ideally typically straight in a non-loaded state of the chain.

FIG. 2 shows several chain elements of a chain as claimed in the prior art, in particular two bolts B and two link plates L, in a loaded state, in particular with a tensile force F. It can be seen that the chain elements, in particular the bolts and link plates, are deformed in a loaded state of the chain, in particular deviate from the ideally typically straight form. This is essentially to be traced back to the tensions brought about as a result of the tensile force.

FIG. 3 shows several chain elements of a chain as claimed in the invention, in particular two bolts 1 and two link plates 2, in a non-loaded state, in particular without tensile force F. It can be seen that the chain elements, in particular the bolts and link plates, are not straight in a non-loaded state of the chain. The representation is shown in an exaggerated manner. The chain elements, in particular the bolts and link plates, are installed with pretensioning.

FIG. 4 shows several chain elements of a chain as claimed in the invention, in particular two bolts 1 and two link plates 2, in a loaded state, in particular with a tensile force F. It can be seen that the chain elements, in particular the bolts and link plates, are ideally typically straight in a loaded state of the chain. This is essentially to be traced back to the fact that the tensions resulting from the tensile force counteract the pretensioning. In the ideal case, the aforementioned tensions cancel each other out. It could be cited slightly loosely that the loaded chain as claimed in the invention is similar to the non-loaded chain as claimed in the prior art with reference to the outer form thereof.

The effect of this is that the chain does not have straight chain elements, in particular link plates, bolts and/or sleeves, until it is under its regular load. In other words: A chain provided with the proposed chain elements is not pulled straight until under load, that is to say under tensile load it has a form which corresponds to that of a non-loaded chain as claimed in the prior art. This means that a high level of dimensional stability of the traction-loaded chain is assured, as a result of which, for example, the engagement of a gear wheel or the rotation of the individual chain links, loosely said the running of the chain, can be improved, this not being achieved, however, by using more or more expensive material.

A further advantage of the invention is produced by the bolt which is curved less under load or is not curved at all under load. The support faces between the sleeves and the bolts are increased and the so-called edge pressure is reduced. Sleeves and bolts lie on top of each other in an optimum manner. This means a reduction in wear.

A chain as claimed in the invention essentially comprises a number of chain links. A chain link comprises a number of chain elements, in particular link plates 2 with link plate holes 3, bolts 1 and/or sleeves 4. The link plates 2 can be developed, for example, as outer link plates. In this case, the chain link preferably comprises link plates 2 and bolts 1. The link plates can additionally be developed as inner link plates. In this case, the chain link preferably comprises link plates and sleeves 4. In a chain, in each case the bolts 1 are inserted through the sleeves 4 and consequently a number of chain links are arranged one behind another. The aforementioned embodiment forms a really simple chain. More than two link plates per chain link are also conceivable such that also intermediate link plates are conceivable.

FIGS. 5 to 11 show chain elements prior to being joined together to form a chain link or a chain. In particular, FIGS. 5 to 11 serve for the purpose of explaining in more detail the different possibilities for generating pretensioning inside the chain link. The individual non-installed chain elements have longitudinal axes, in particular the link plate 2 has a longitudinal axis 6, the bolt 1 has a longitudinal axis 5 and the sleeve 4 has a longitudinal axis 5. Insofar as it is assumed that a link plate has two side faces 8 and one end face 9, at least one side face 8 facing the bolt 1 or the sleeve 4, a longitudinal axis 6 should be assumed which is produced in a top view on the end face 9 of the link plate 2. Perspective views of a link plate, a bolt and a sleeve are shown as examples in FIG. 14.

Each link plate hole 3 has a hole axis 7. Insofar as the link plate holes 3 are circular bores, instead of the hole axis, it is also possible to speak of a bore axis or center axis. In principle, arbitrary forms of the link plate holes are conceivable.

The aforementioned chain elements can be installed to form a chain link. An installed state of the chain links is shown in FIG. 10a. To clarify the differences between a non-installed and an installed state of the aforementioned chain elements, in particular with reference to the longitudinal axes thereof, the respective longitudinal axes of the link plate, bolt and sleeve are characterized in the installed state by way of a line, accordingly as 5' and 6'. The representation of the curvatures is shown in an exaggerated manner and serves to visualize the respective curvatures. Materials, in particular steels, which enable corresponding reshaping and which have sufficient elastic characteristics, in particular in order to build up corresponding tension inside the chain link, are used for the individual chain elements.

As already addressed above, the chain elements or the link plate holes can have different developments. The following table gives an overview of the possible developments which can lead to a desired pretensioning, in particular a negative pretensioning, inside the chain link or the chain.

| Variants | Bolt/ sleeve | Link plate | Link plate hole |
|---|---|---|---|
| 1 (FIG. 5) | straight | straight | oblique |
| 2 (FIG. 6) | straight | curved | vertical |
| 3 (FIG. 7) | straight | curved | oblique |
| 4 (FIG. 8) | curved | straight | vertical |
| 5 (FIG. 9) | curved | straight | oblique |
| 6 (FIG. 10) | curved | curved | vertical |
| 7 (FIG. 11) | curved | curved | oblique |

A first variant of a chain link is shown in FIG. 5. In a non-installed state, the longitudinal axis 6 of the link plate 2 and also the longitudinal axis 5 of the bolt 1 are straight. The hole axis 7 of the link plate holes 3, in said variant, however, is not aligned at right angles to the longitudinal axis 6 of the link plate 2, that is to say oblique link plate holes are provided in the link plates. This could also be characterized in that the link plate holes are set obliquely with respect to the longitudinal running of the chain. To produce the chain link, the bolt ends are introduced into the link plate holes 3. As the bolts 1 and the link plates 2 are straight, the link plate holes 3 however oblique, both the link plates 2 and the bolts 1 are curved by the tension created such that the shape of the resulting chain link is approximately as that indicated in FIG. 10a. The oblique link plate holes can be realized in production in a particularly advantageous manner and make it possible to produce a pretensioned chain link or a chain with negative pretensioning in a cost-effective manner. The longitudinal axis 5' of the bolts and also the longitudinal axis 6' of the link plates inside the chain link is not straight, in particular is curved. The hole axis is also designated in the installed state by the reference 7 as it does not curve—at least to a technically relevant extent. In principle, in this case and also in the following variants, chain elements which do not actually match each other are therefore installed together. Particularly advantageous in the case of said variant is that link plates and bolts can be produced in each case with a straight extension and the pretensioning, in particular the negative pretensioning, is not created until the chain link or the chain is assembled. The chain link according to FIG. 10a is distinguished in particular in that the link plates 2 are curved outward and the bolts 1 or sleeves 4 are curved inward.

In order to avoid repetition, it should be pointed out that all chain links produced according to the variants, in principle, can assume a shape as indicated in FIG. 10a. Slight deviations can be produced in particular by an oblique or non-oblique alignment of the link plate holes.

Figure 6:
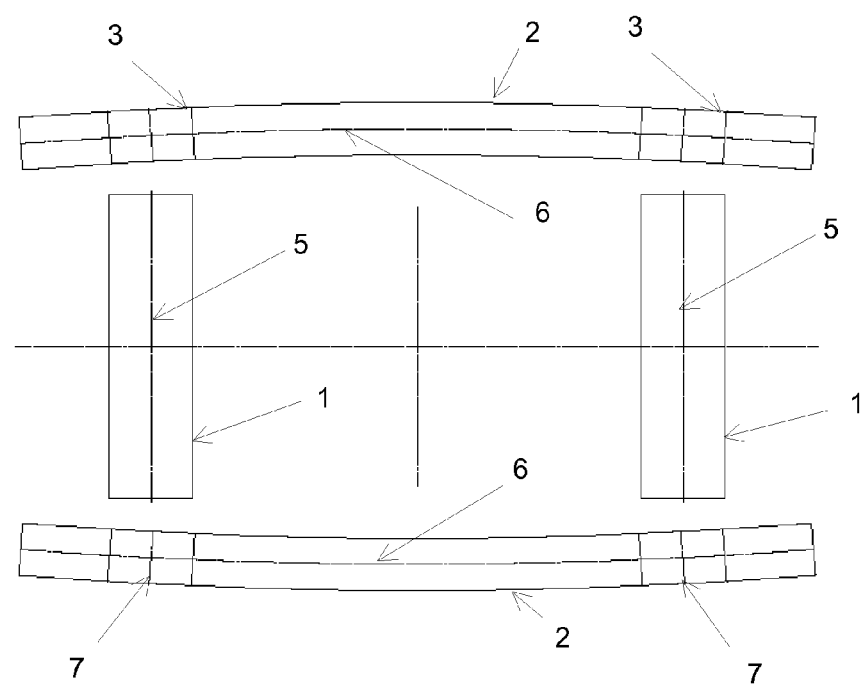

A second variant of a chain link is shown in FIG. 6. In a non-installed state, the longitudinal axis 6 of the link plate 2 is curved and the longitudinal axis 5 of the bolts 1 is straight. Put simply, curved link plates 2 are installed with straight bolts 1 in said variant. The hole axis 7 of the link plate holes 3 is aligned in said variant at right angles to the respective portion of the longitudinal axis 6 of the link plate or to the running direction of the chain, that is to say straight link plate holes 3 are provided in the link plates 2 for the respective portion. To produce the chain link, the bolt ends are introduced into the link plate holes 3. As the bolts 1 are straight, the link plates 2 however curved, the bolts 1 are also curved by the tension created such that the shape of the resulting chain link is approximately as indicated in FIG. 10a. Overall, the chain link, in particular the chain elements thereof, is under a desired tension.

A third variant of a chain link is shown in FIG. 7. In a non-installed state, the longitudinal axis 6 of the link plate 2 is curved and the longitudinal axis 5 of the bolts 1 is straight. Put simply, curved link plates 2 are installed with straight bolts 1 in said variant. In this variant, the hole axis 7 of the link plate holes 3 is aligned obliquely with respect to the respective portion of the longitudinal axis 6 of the link plate or to the running direction of the chain, that is to say oblique link plate holes 3 are provided in the link plates 2 for the respective portion of the longitudinal axis. To produce the chain link, the bolt ends are introduced into the link plate holes 3. As the bolts 1 are straight, the link plates 2 however curved and the link plate holes 3 beveled, the bolts 1 too are curved by the tension created such that the shape of the resulting chain link is approximately as that indicated in FIG. 10a. Overall, the chain link, in particular the chain elements thereof, is under a desired tension. The production technique of the aforementioned variant is particularly advantageous as the bolt ends and the respective link plate holes 3 can already be aligned with respect to each other to some extent in a non-installed state.

A fourth variant of a chain link is shown in FIG. 8. In a non-installed state, the longitudinal axis 6 of the link plate 2 is straight and the longitudinal axis 5 of the bolts 1 is curved. Put simply, straight link plates are installed with curved bolts in said variant. The hole axis 7 of the link plate holes 3 is aligned in said variant at right angles to the respective longitudinal axis of the link plate or to the running direction of the chain, that is to say straight link plate holes 3 are provided in the link plates 2. To produce the chain link, the bolt ends are introduced into the link plate holes 3. As the bolts 1 are curved and the link plate holes 3 vertical or straight, the link plates 2 are also curved by the tension created such that the shape of the resulting chain link is approximately as indicated in FIG. 10a. Overall, the chain link, in particular the chain elements thereof, is under desired tension as a result of the chain elements which actually do not match.

Figure 9:
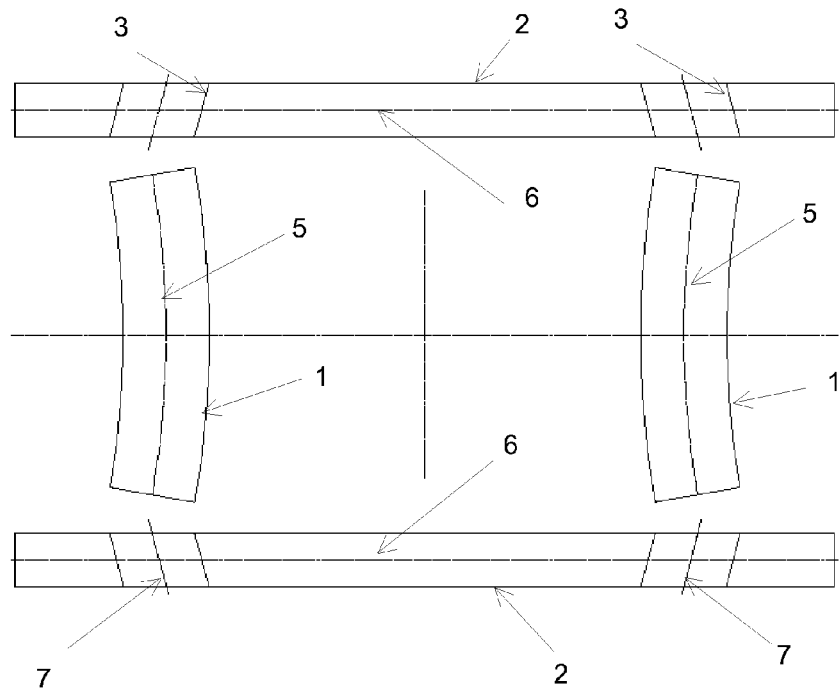

A fifth variant of a chain link is shown in FIG. 9. In a non-installed state, the longitudinal axis 6 of the link plate 2 is straight and the longitudinal axis 5 of the bolts 1 is curved. Put simply, straight link plates are installed with curved bolts in said variant. The hole axis 7 of the link plate holes 3 is aligned in said variant obliquely with respect to the longitudinal axis 6 of the link plate or to the running direction of the chain, that is to say oblique link plate holes 3 are provided in the link plates 2. To produce the chain link, the bolt ends are introduced into the link plate holes 3. As the bolts 1 are curved, the link plates 2 however straight and the link plate holes 3 are beveled, the link plates 2 are also curved by the tension created such that the shape of the resulting chain link is approximately as indicated in FIG. 10a. Overall, the chain link, in particular the chain element thereof, is under a desired tension. The manufacturing technique of the aforementioned variant is particularly advantageous as the bolt ends and the respective link plate holes can already be aligned to each other to some extent in a non-installed state.

Figure 10:
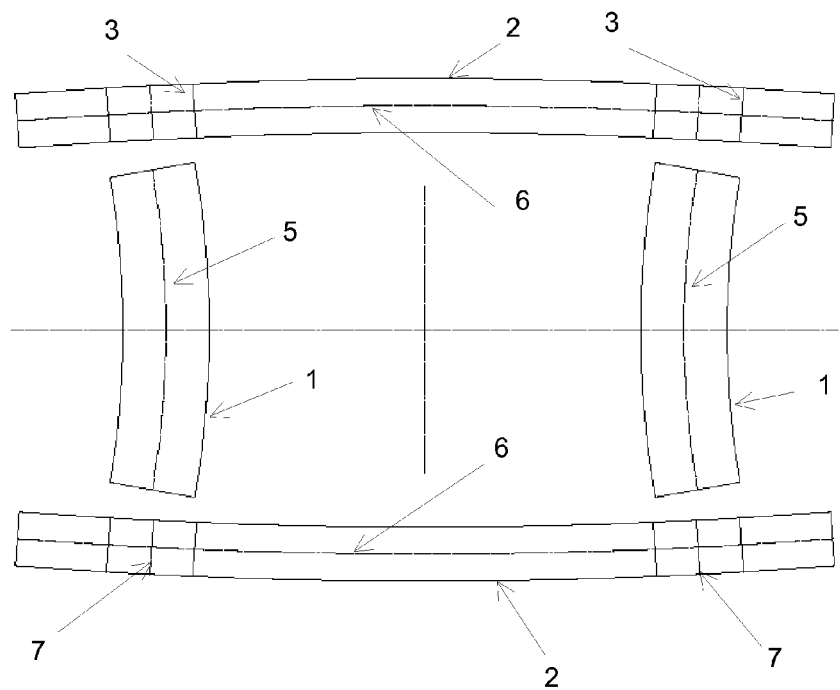
Figure 10A:
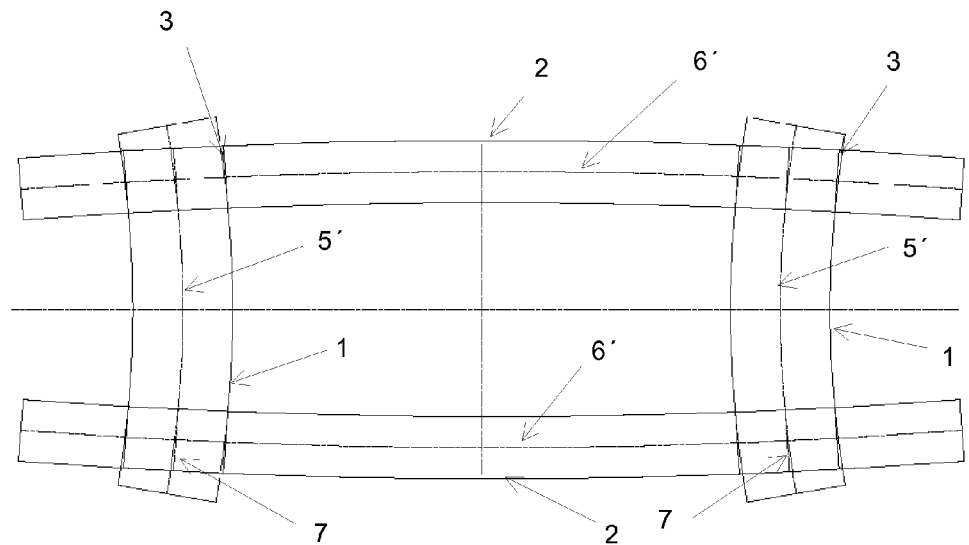
FIG. 10a shows a chain link assembled from the chain elements according to one of FIGS. 5 to 11.

A sixth variant of a chain link is shown in FIG. 10. In a non-installed state, the longitudinal axis 6 of the link plate 2 is curved and the longitudinal axis 5 of the bolts 1 is curved. Put simply, curved link plates are installed with curved bolts in said variant. The hole axis 7 of the link plate holes 3 is aligned in said variant at right angles to the respective portion of the longitudinal axis of the link plate or to the running direction of the chain, that is to say straight link plate holes 3 are provided in the link plates. To produce the chain link, the bolt ends are introduced into the link plate holes 3. The curvature of bolt 1 and link plate 2 can be developed in such a manner that tension is nevertheless created in the chain link, in particular in the chain elements. The manufacturing technique of the aforementioned variant is particularly advantageous as the bolt ends and the respective plate link holes can already be aligned with one another to some extent in a non-installed manner.

Figure 11:
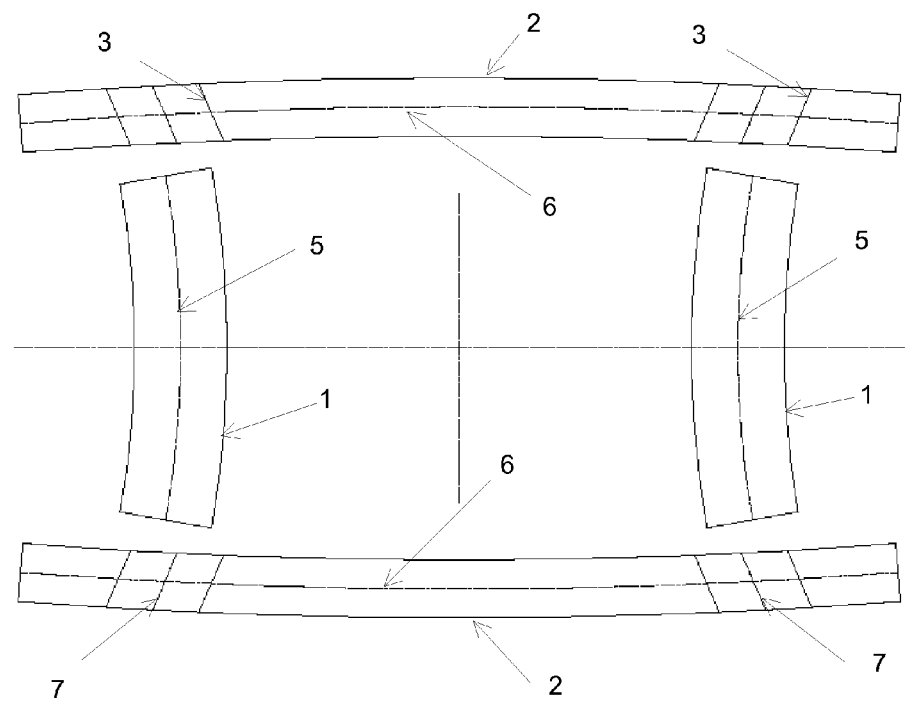

A seventh variant of a chain link is shown in FIG. 11. In a non-installed state, the longitudinal axis 6 of the link plate 2 is curved and the longitudinal axis 5 of the bolts 1 is curved. Put simply, curved link plates are installed with crooked bolts in said variant. The hole axis 7 of the link plate holes 3 is aligned in said variant obliquely with respect to the respective portion of the longitudinal axis of the link plate or to the running direction of the chain, that is to say oblique link plate holes are provided in the link plates. To produce the chain link, the bolt ends are introduced into the link plate holes 3. The curvature of bolt and link plate and also the alignment of the link plate holes can be developed in such a manner that tension is nevertheless created in the chain link, in particular in the chain elements. The manufacturing technique of the aforementioned variant is particularly advantageous as the bolt ends and the respective link plate holes are already aligned to one another to some extent in a non-installed state.

Representation of the variants which have sleeves 4 in place of bolts 1 has been omitted so as to avoid repetition. In the aforementioned variants, the solid bolt 1 can be replaced by a hollow-cylindrical sleeve 4. The development of the sleeve, that is to say a straight or curved sleeve, corresponds to the respective defaults of the bolt in the individual variants.

It can be seen that the result of the manufacture of a chain link using at least one above-outlined chain element, as a rule, is a chain link with a curved link plate and a curved bolt (cf. FIG. 10a). The bending of the link plate 2 and bolt 1 in an installed state, that is to say inside a chain link, can be predetermined as extensively as possible, for example by appropriate material selection and/or selection of the curvature prior to assembly. Thus, for example, it can also be provided that the curvature of the link plates is very slight or the link plate remains straight in the installed state. Nonetheless, the bolt 1 is curved and the chain link or the chain elements are under the required pretensioning. Said embodiment with link plates as straight as possible is particularly interesting technically as in this way collisions with the link plates of adjacent chain links can be avoided in a simple manner.

Figure 12:
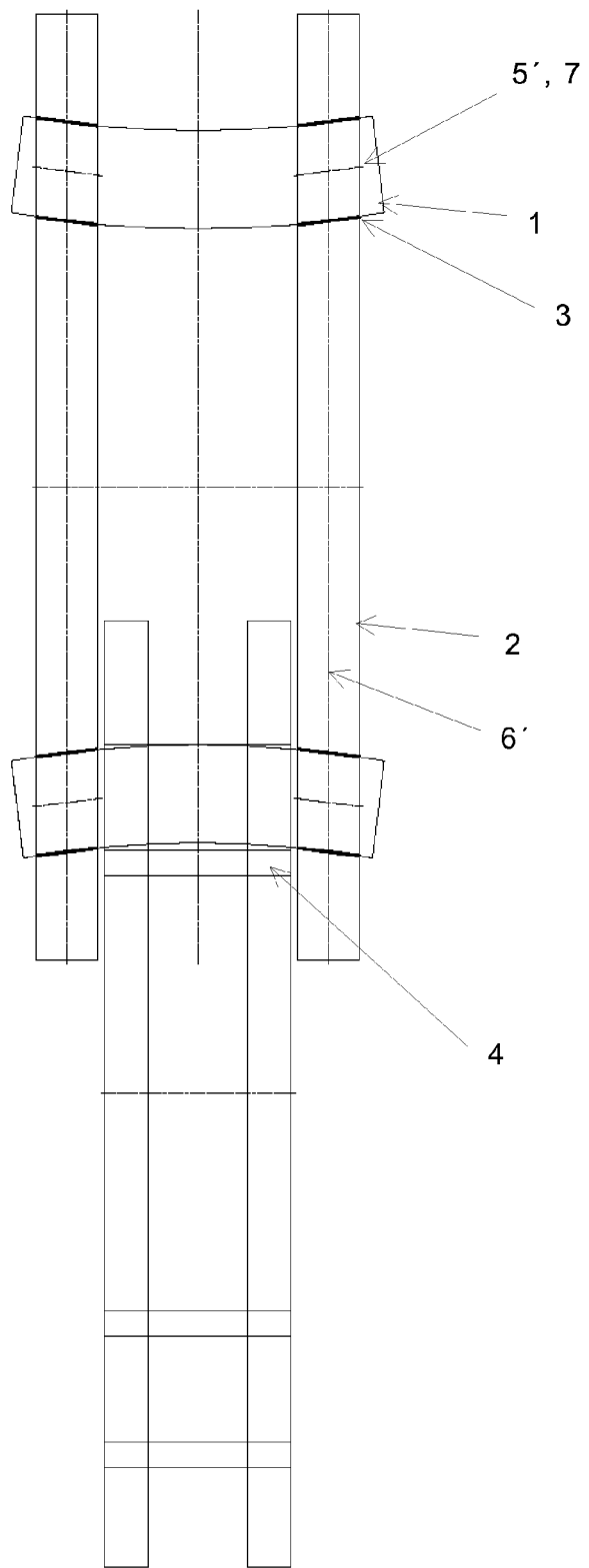
FIG. 12 shows a chain as claimed in the invention.

FIG. 12 shows a chain as claimed in the invention with two chain links. The left-hand chain link is a chain link which has been assembled from straight link plates 2, oblique link plate holes 3 and straight bolts 1 (cf. variant according to FIG. 5). Through corresponding manufacturing technology, care has been taken to ensure that the link plate 2, even in the installed state, that is to say in the chain link, has remained as straight as possible. The bolts 1, however, are curved. The second, right-hand chain link is a chain link as claimed in the prior art with link plates 2 and sleeves 4. A bolt 1 of the first chain link is guided through a sleeve 4 of the second chain link. The chain is shown in a non-loaded state, i.e. no tensile forces are acting on the chain links. It is comprehensible that the chain, in particular the bolt is "pulled straight" when a corresponding tensile force acts on the chain, in particular on the bolts. In the ideal case, the bolts 1 or sleeves 4 are then straight, that is to say the longitudinal axes 5 thereof are parallel, and the link plates 2 are straight, that is to say the longitudinal axes 6 thereof are parallel. The chain can obviously be extended more by further chain links, it being possible to use both chain links with pre-tensioned chain elements, also in the embodiment with sleeves, and chain links as claimed in the prior art, that is to say without pre-tensioned chain elements.

Figure 13:
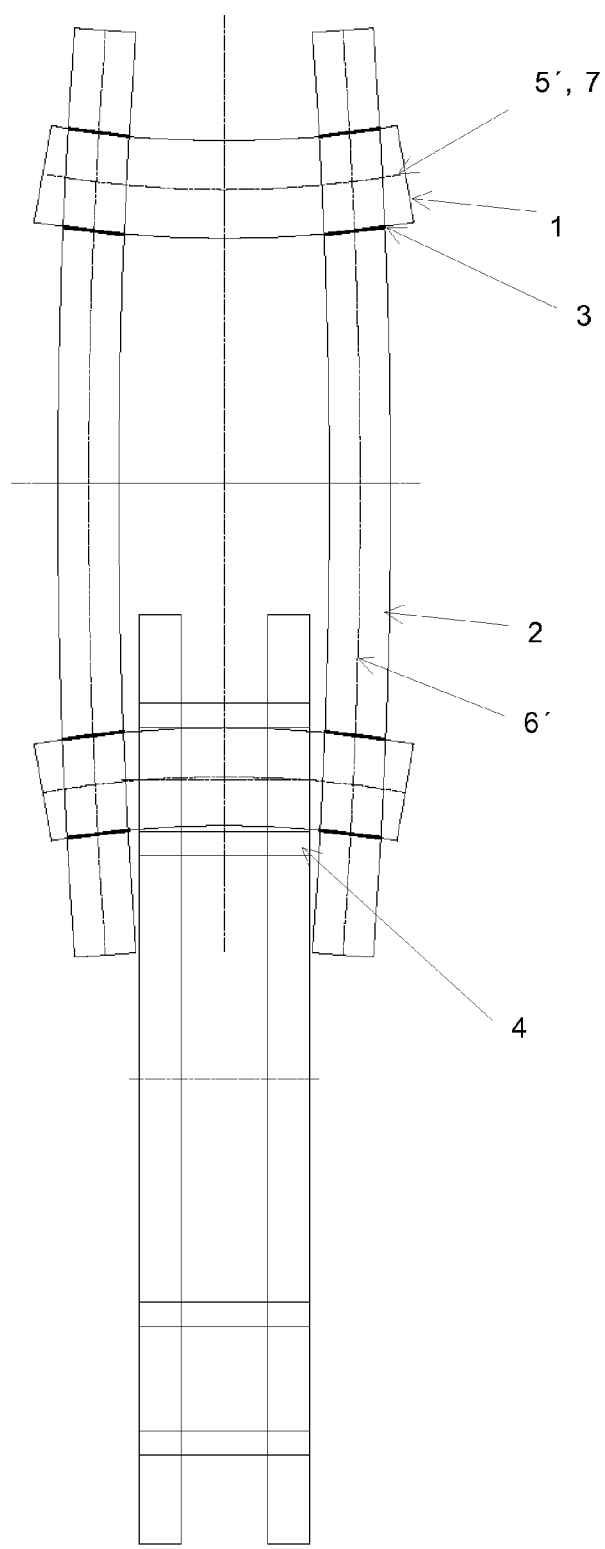
FIG. 13 shows a chain as claimed in the invention.

FIG. 13 shows a chain as claimed in the invention with two chain links. The left-hand chain link is a chain link with pre-tensioned chain elements, which has been assembled from curved link plates 2, vertical link plate holes 3 and curved bolts 1 (cf. sixth variant according to FIG. 10). Once again, a chain link with sleeves 4 as claimed in the prior art is used as the second chain link, it obviously also being possible in this case too to use a chain link with pre-tensioned sleeves 4 or other pre-tensioned chain elements. Otherwise, reference can be made to the designs in FIG. 12, the link plates also being "pulled straight" in the present embodiment.

Just two combinations of chain links in a chain as claimed in the invention have been looked at in detail above. However, it is fundamentally possible to combine together each of the above-mentioned variants of the chain links in each case in the pairing with bolts or with sleeves. Thus, for example, the first variant with bolts can be combined together with the second variant with sleeves. The variants with conventional chain links can also be combined to form a chain as claimed in the invention.

The invention claimed is:

1. A chain, comprising: a plurality of chain elements disposed to form a chain of chain elements, wherein at least one said chain element is installed with pretensioning, said chain element being a link plate having a longitudinal axis and link plate holes with a hole axis for accommodating a bolt end or a sleeve end, wherein said hole axis is not aligned at right angles with respect to the longitudinal axis or to a direction of pull of the chain.

2. The chain according to claim 1, wherein said chain is a chain selected from the group consisting of a technical chain, a one-dimensionally movable chain (plate link chain), and a bolt chain or roller chain.

3. The chain according to claim 1, wherein said at least one chain element installed with pretensioning is installed with pretensioning that is negative to a pulling direction occurring when the chain is under tensile load.

4. The chain according to claim 1, wherein said chain element is at least one element selected from the group consisting of a bolt, a link plate, and a sleeve.

5. The chain according to claim 1, wherein said at least one chain element installed with pretensioning has a form that deviates from a straight form in a non-loaded state of the chain.

6. The chain according to claim 1, wherein said chain element is a link plate having a longitudinal axis, and the longitudinal axis is not straight in a non-traction-loaded state of the chain.

7. The chain according to claim 6, wherein said longitudinal axis of said link plate has a curved form.

8. The chain according to claim 1, wherein said chain element is a bolt or a sleeve with a longitudinal axis, and the longitudinal axis is not straight in a non-traction-loaded state of the chain.

9. The chain according to claim 6, wherein said longitudinal axis has a curved form.

10. The chain according to claim 1, wherein said hole axis is aligned obliquely with respect to the direction of pull of the chain.

11. A chain, comprising:
    a plurality of chain elements disposed to form a chain of chain elements, wherein at least one said chain element is installed with pretensioning;
    at least two bolts or sleeves and two link plates forming one chain link of the chain, wherein said bolts or sleeves, in a non-loaded state of the chain, have a curvature which in each case faces the other bolt or sleeve, wherein said link plates, in a non-traction-loaded state of the chain, have a curvature in each case facing away from the respectively other link plate.

12. The chain according to claim 11, wherein said link plates, in a traction-loaded state of the chain, are aligned parallel to each other, wherein said bolts or sleeves, in the traction-loaded state of the chain are aligned parallel to each other.

13. The chain according to claim 12, wherein said link plates have longitudinal axes which, in the traction-loaded state of the chain, are aligned parallel to each other, and in particular the longitudinal axes thereof, and said bolts or sleeves have longitudinal axes which, in the traction-loaded state of the chain, are aligned parallel to each other.

14. A method of manufacturing a chain, the method which comprises the following:
    providing one or more of the following:
        a link plate having a longitudinal axis, wherein the longitudinal axis is not straight in a non-installed state of the link plate; and/or
        a link plate having a longitudinal axis and link plate holes having a hole axis, wherein the hole axis is not aligned at right angles, with respect to the longitudinal axis or to a direction of pull of the chain; and/or
        a bolt and/or a sleeve having a longitudinal axis, wherein in a non-installed state of the bolt or of the sleeve, the longitudinal axis is not straight;
    assembling at least one chain link from at least two link plates with link plate holes and two bolts or sleeves; and
    assembling the chain from at least two chain links, and thereby including at least one chain link manufactured in this manner, to form the chain including:
    a plurality of chain elements disposed to form a chain of chain elements, wherein at least one said chain element is installed with pretensioning.

15. The method according to claim 14, wherein the providing step comprises providing the link plate with a curved longitudinal axis.

16. The method according to claim 14, wherein the providing step comprises providing the link plate with link plate holes having a hole axis aligned obliquely with respect to the longitudinal axis or to the direction of pull of the chain.

17. The method according to claim 14, wherein the providing step comprises providing the bolt and/or the sleeve with a curved form.

* * * * *